Feb. 18, 1941.  F. KRONER  2,232,032
IMAGE SHEET
Filed March 4, 1938   2 Sheets-Sheet 1
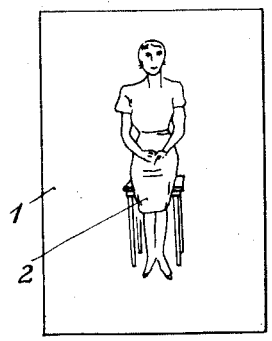
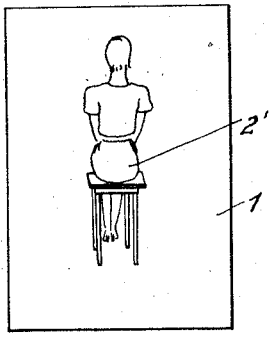
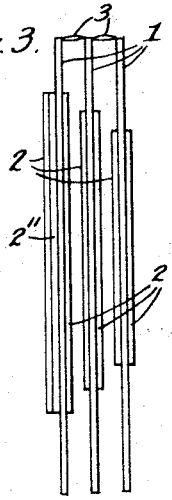
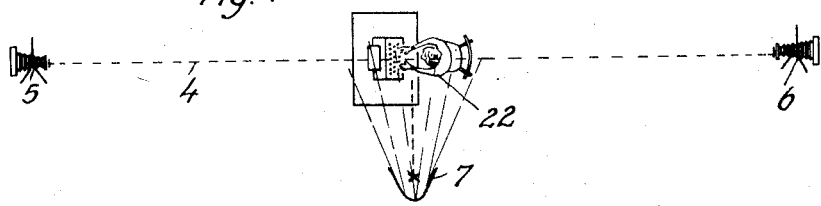
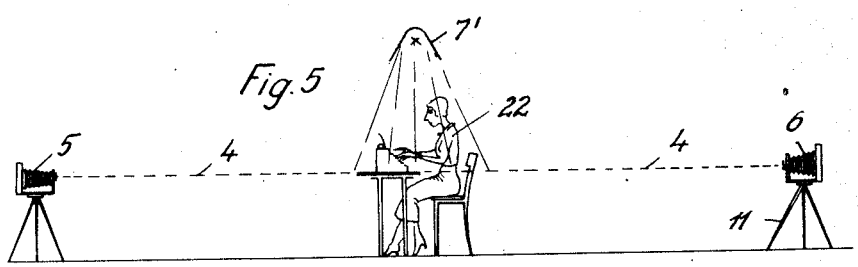
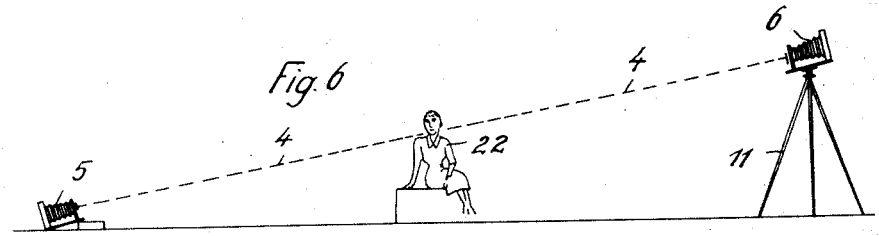

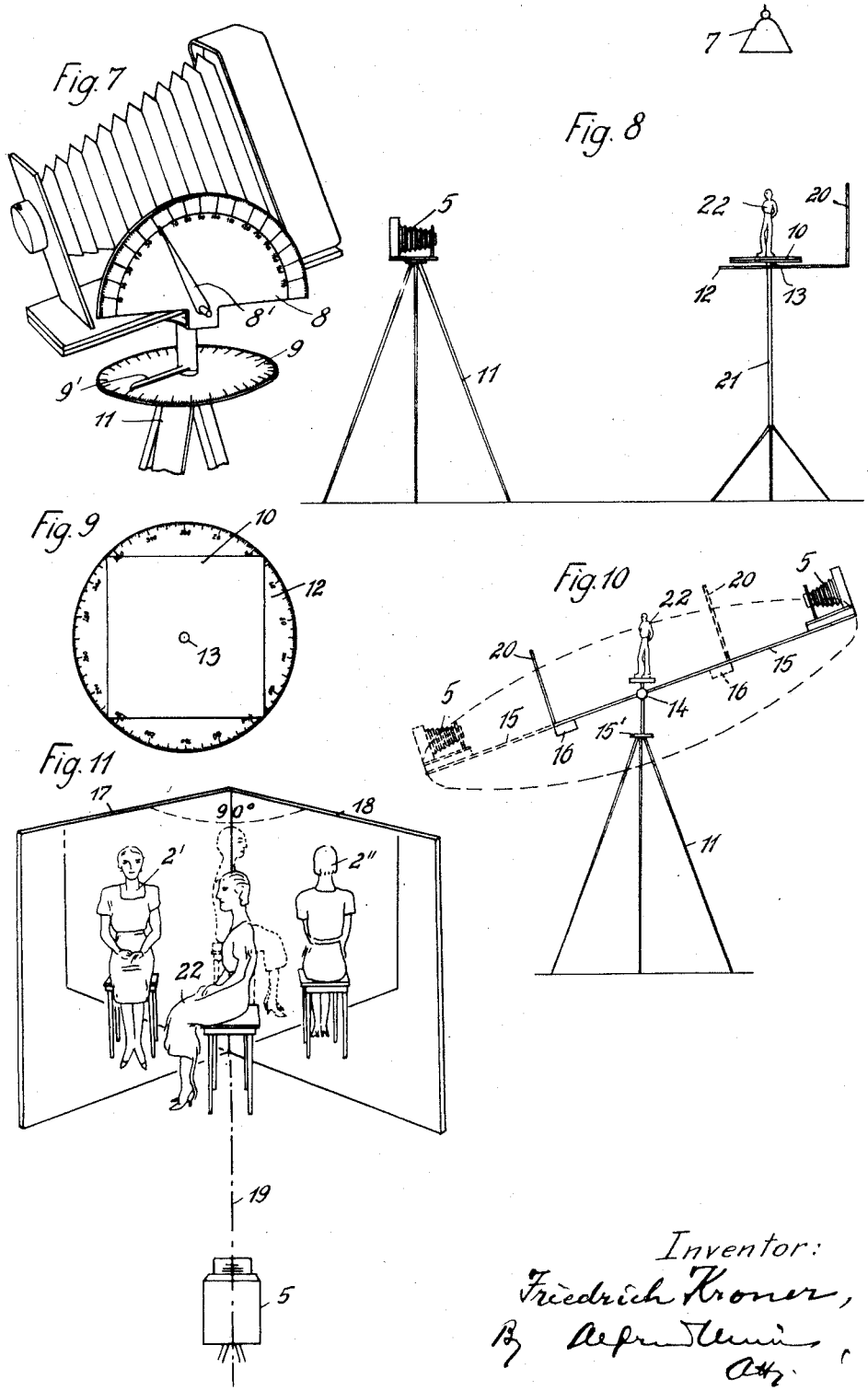

Patented Feb. 18, 1941

2,232,032

UNITED STATES PATENT OFFICE 2,232,032

IMAGE SHEET

Friedrich Kroner, Berlin-Charlottenburg, Germany, assignor to Transart Aktiebolag, Goteborg, Sweden Application March 4, 1938, Serial No. 193,857
In Germany February 24, 1937

3 Claims. (Cl. 95—5)

This invention relates to photographic image sheets and means and methods of producing such image sheets.

It is an object of my invention to obtain special optical pictorial effects by combination of transparent flexible sheets and photographic images.

Another object of the invention is to produce by means of image sheets the impression of a complete view of a physical body.

Still another object of the invention is to illustrate the interior of any objects, in different sections, in a manner to give the impression of viewing into the body proper.

Still another object of the invention is to produce in a novel manner different views of a landscape, part of a city or house, from different viewing points.

Further objects and features of the invention will be clear from the following detailed description in connection with the accompanying drawings, showing by way of example and schematically some embodiments of image sheets according to the invention and arrangements for producing such sheets, viz.—

Fig. 1 is a front view of an image sheet having the invention applied thereto.

Fig. 2 is a back view of the same image sheet.

Fig. 3 is a side view of a plurality of image sheets of the type shown in Figs. 1 and 2.

Fig. 4 is a plan view of an arrangement for producing pictures of the kind shown in Figs. 1 and 2.

Fig. 5 is a side elevation of the arrangement shown in Fig. 4.

Fig. 6 is a side elevation of a similar arrangement as in Figs. 4 and 5, but for photographing objects in inclined directions.

Fig. 7 is a perspective view, on a larger scale, of the camera shown in Fig. 6.

Fig. 8 is a side elevation of an arrangement for taking photographic images of the opposite sides of objects by means of a single camera.

Fig. 9 is a plan view of the dial of the stand shown in Fig. 8.

Fig. 10 is an elevation of still another arrangement for photographing objects from two opposite sides, by means of a single camera which is movably mounted.

Fig. 11 is a perspective view of a mirror arrangement for photographing objects from two opposite sides.

Referring now to the drawings in greater detail, and first to Figs. 1 to 3, three sheets I of transparent material are shown in Fig. 3 with image layers 2 and 2' applied on the left and right hand sides of these sheets which are hingedly connected with each other at 3, so as to ensure accurate register of the superposed sheets and images. The two opaque layers 2 and 2' on the sheet I in Figs. 1 and 2 are limited by the contours of the physical object shown on the image while the marginal portions of the sheet I outside these contours remain transparent. The two image layers 2 and 2' in this case represent pictures of the same object, viewed in equal distances from opposite sides so that the contours of the two image layers are in accurate register. Various arrangements for producing such pictures will be hereinafter described.

A fundamental arrangement for taking pictures of the kind illustrated in Figs. 1 to 3 is shown in Figs. 4 and 5, showing an object 22 and two photographic cameras 5 and 6, arranged on stands 11 at equal distances on opposite sides of the object 22, in such a manner that their optical axes 4 are coaxial and pass through the middle of the said object, as indicated. Thus, two photographs are obtained which have exactly the same contours but show, within these contours, the physical object from opposite sides, as when going round the object and viewing upon it from opposite sides. It will be understood that in order to get natural pictures, a suitable lighting must be provided, for example, from a source of light 7 arranged laterally symmetrical to the two cameras, Fig. 4, or from a source of light 7', arranged vertically or obliquely above the object, Fig. 5.

The arrangement according to Fig. 6 is quite similar except that the optical axes of the two cameras 5 and 6 are inclined so that the object is photographed in oblique directions. The correct setting of the two cameras in both directions is facilitated by a vertical dial or graduation 8 and a horizontal dial or graduation 9 and corresponding indicators 8' and 9'.

Where the objects to be photographed are of a limited size and weight, they may be positioned on a rotary disc or platform 10, pivoted at 13, as shown in Figs. 8 and 9, and photographed from a single camera 5 at first in one position and then in a second position rotated through an angle of 180° with respect to the first position. The correct setting of the disc or platform 10, which is supported by a stand 21, can be read from a dial or graduation 12 underneath the platform 10, bearing a suitable angle meter or scale, as indicated. It will be understood that in order to take the two congruent pictures with the same setting of the focus of the camera 5 which is required in order to obtain pictures in the same scale, the middle axis of the figure or other object 22 must be approximately coaxial with the pivot 13 of the platform 10. A source of light is indicated at 7 in Fig. 8.

Where it is intended to photograph objects in inclined directions, an arrangement as shown in Fig. 10 may be used, comprising a stand 11, a stationary or rotary platform 10 for the object 22 on the top of the stand and a two-armed lever 15 supported on the stand 11 by means of a joint 14 permitting swinging in vertical and horizontal directions, carrying at the extreme end of its longer arm 15 the photographic camera 5 and at the extreme end of its shorter arm 15' a counterweight 16 and, if desired, a screen 20. Vertical and horizontal scales (not shown) are provided at 14 so as to permit accurate adjustment of the desired angle of inclination of the lever 15 and accurate swinging of the camera through 180°.

Furthermore it is within the purview of my invention to photograph the objects in question from two exactly opposite sides by means of mirrors or prisms, for example, in the manner shown in Fig. 11, illustrating two mirrors 17 and 18 positioned at an angle of 90°, a camera 5 with its optical axis 19 exactly on the 45° plane between the two mirrors and an object 22, with its center line also on the 45° plane. It will be understood that in case of a substantially symmetrical lighting of the object, the camera will take two pictures 2' and 2'' of the object in question, showing the front and back thereof, within exactly similar contours.

In order to produce image sheets as shown in Figs. 1 to 3, the two photographic pictures obtained by any of the arrangements and methods illustrated in the Figs. 4 to 11 have to be transferred in any suitable manner upon the said transparent sheets 1, in such a manner that a photographic image layer is produced only within the contours of the object in question, while the "background," that is to say the region outside the said contours must remain perfectly transparent. Various methods may be used to this end. The simplest method of producing an image without "background" would be to cut out the photographic image of the object or to provide on the negative an opaque layer outside the contours of the image of the object, but I prefer to photograph the image directly without a background. To this end, I may use the mirror arrangement shown in Fig. 11 or I may provide a white screen behind the object in either of the arrangements shown in Figs. 8 or 10, as indicated at 20 in both figures.

In order to apply the photographic pictures thus obtained to the transparent support 1, I may produce a transparent or opaque positive image on a paper or like base which is cut out in accordance with the contours of the object and attached to the transparent sheet by means of an adhesive. I prefer, however, to print the image directly on the transparent sheet 1, by a photographic or other suitable printing process.

I use a transparent sheet material of the kind known as "cellulose glass" or "glass cellulose" which consists substantially of cellulose derivatives, as, for example, celullose hydrate, cellulose acetate or the like, one material of this type being known under the registered trade-mark "Cellophane." Materials of this kind lend themselves very well for use as supports for photographic images which may be printed on the sheet photographically or by another suitable printing process.

Where the photographic image is printed directly upon the transparent sheet, an opaque intermediate layer has to be applied between the two pictures on the opposite sides of the transparent sheet or between one image layer and the transparent sheet respectively, as indicated at 2'' in Fig. 3. This opaque layer 2'' may be printed on the sheet 1 prior to the printing of the photographic picture or in a single operation with the photographic picture. To this end, opaque colours may be used in the printing operation or, in case of photographic printing, a photographic process may be applied which permits to develop the photographic layer in two separate steps, producing first a uniform opaque base layer within the contours of the photographic image and then an image layer thereon, such process being well known to those skilled in the art of colour photography so that it will not be necessary to describe these processes in a greater detail.

It will be readily understood that my novel image sheets offer many advantages for illustration purposes, for example, to illustrate in a catalogue, text book or the like the inner details of a machine, apparatus, animal, plant or other subject. To this end, a photographic image may be applied on either or both sides of a transparent sheet and any number of such sheets showing different sections of the object may be superposed as shown in Fig. 3, with opaque photographic pictures applied on the inner faces of the front and back covers of the respective catalogue or book like combination and extending over the full size of the transparent sheets, if desired.

Moreover, a street may be illustrated, for instance, by taking photographs in one direction of a street, at different points lying all on the middle axis of the street, applying these photographs to the front sides of superposed transparent sheets, taking further photographs viewing along the street in the opposite direction from different points lying on the middle axis of the street and applying these photographs on the back sides of the same transparent sheets, in the order as taken, in such a manner that the photographs on opposite sides of one sheet coincide as to their contours. Thus, when turning over the sheets combined in the form of a book (Fig. 3) the impression of passing through the street in both directions can be produced.

Various modifications of the embodiments of the invention hereinbefore described will occur to those skilled in the art. For instance, the transparent sheets may be combined in any suitable manner other than in form of a book, for instance as a folded strip, wound up strip or the like. Prisms or the like may be used instead of mirrors, as shown in Fig. 11, in order to produce two pictures at the same time and a stereoscopic camera having two optical systems may be used to take the two pictures. Moreover other suitable thin flexible sheet materials than those hereinbefore described may be used, although the said materials have been found particularly advantageous.

I claim:

1. An image sheet, comprising a transparent flexible sheet, said sheet having applied to the opposite faces thereof, two photographic images representing the same object photographed from opposite sides and having silhouette-like contours which register with each other, and an opaque intermediate layer of identical contour between said images.

2. In a process of producing an image sheet, the steps which comprise photographing an object from opposite sides in such a manner that the two pictures obtained are in accurate register, removing on said photographic image any photographic image portions outside the contours of said object, applying said two pictures upon the opposite faces of a transparent flexible support and providing an opaque layer of identical contour between said two pictures.

3. A plurality of transparent sheets, each bearing on either side within the same contours a photographic image, and an opaque intermediate layer of identical contour between said images, the photographic image on one side of each sheet depicting an object from one point of view, and the photographic image on the other side of said sheet depicting the same object from the reverse point of view, the images on the two sides of one sheet forming composite pictures with the images on corresponding sides of one or more of the other sheets when assembled therewith in superposed relationship.

FRIEDRICH KRONER.